June 2, 1959  F. M. FRAGA  2,888,997
COMPENSATING HITCH
Filed Nov. 30, 1956  4 Sheets-Sheet 3
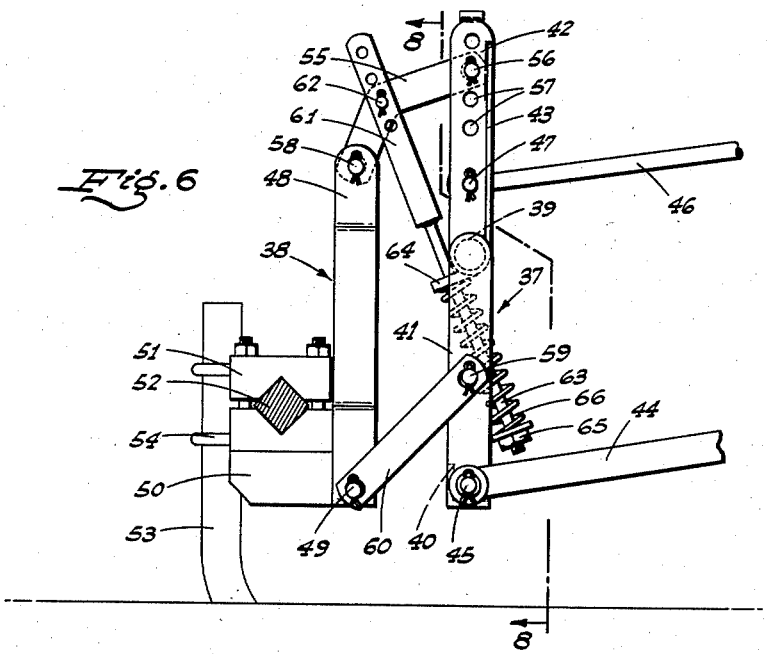
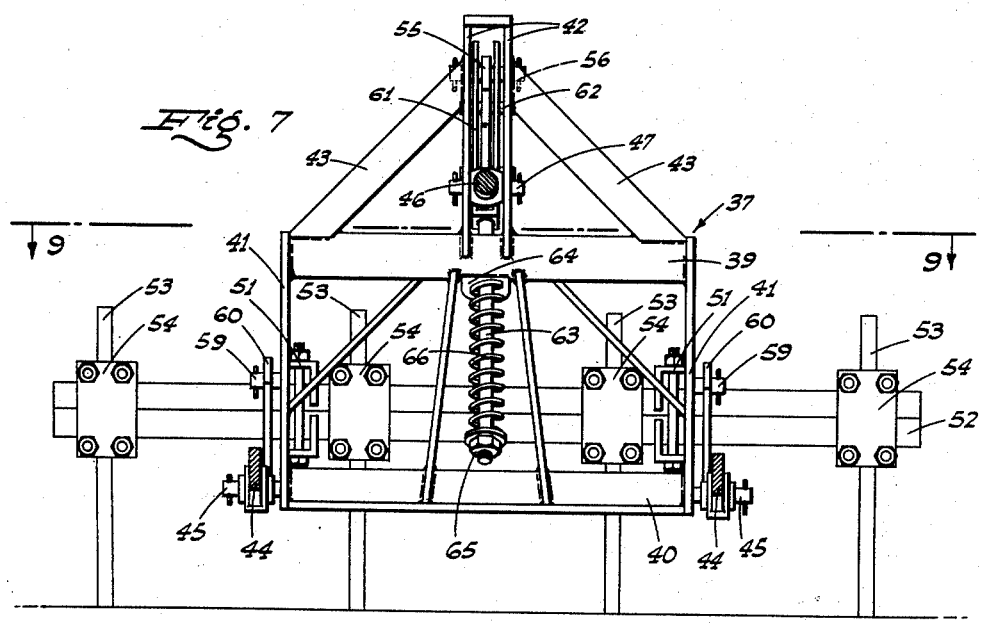
INVENTOR.
Frank M. Fraga
BY
Webster & Webster
ATTYS.

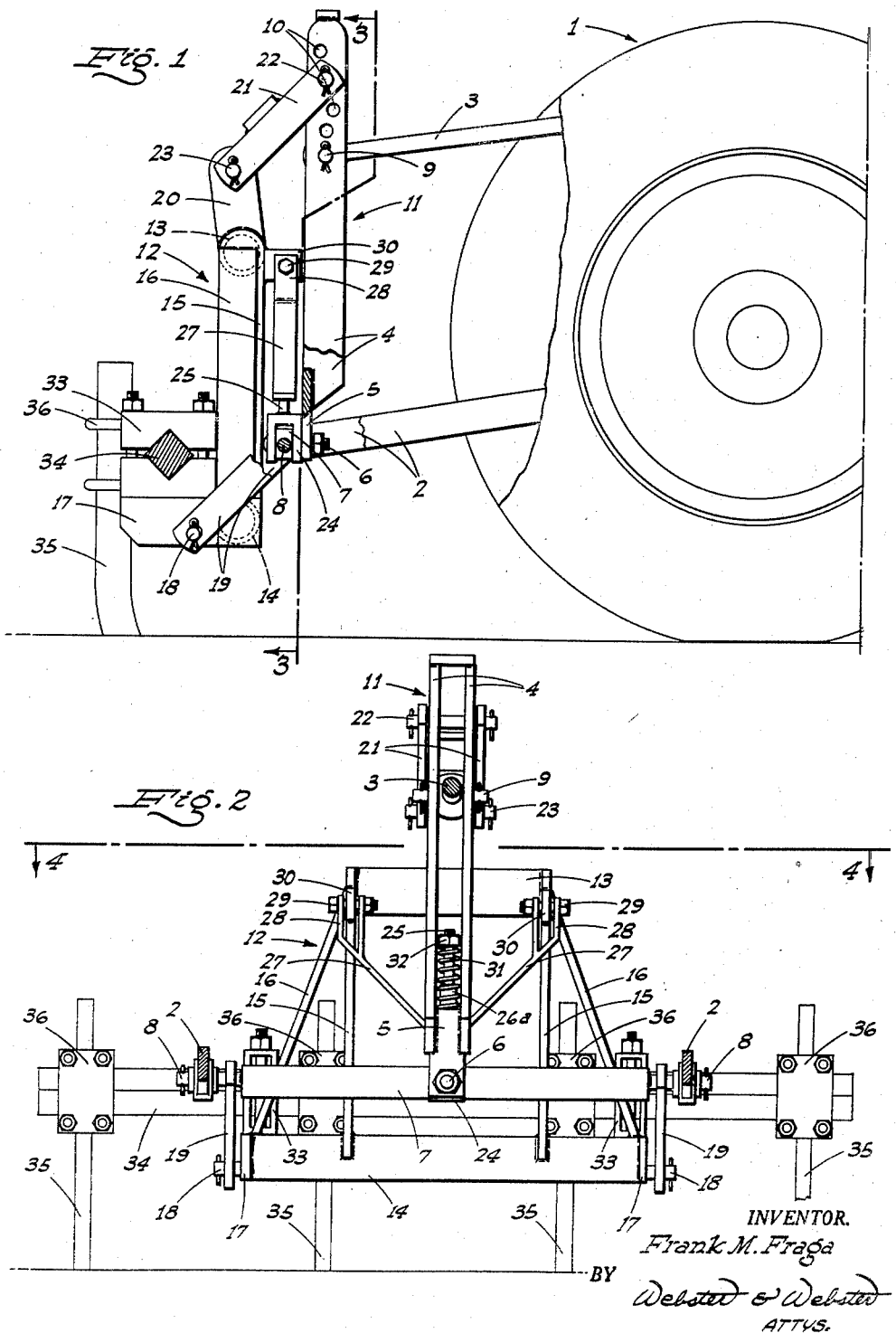

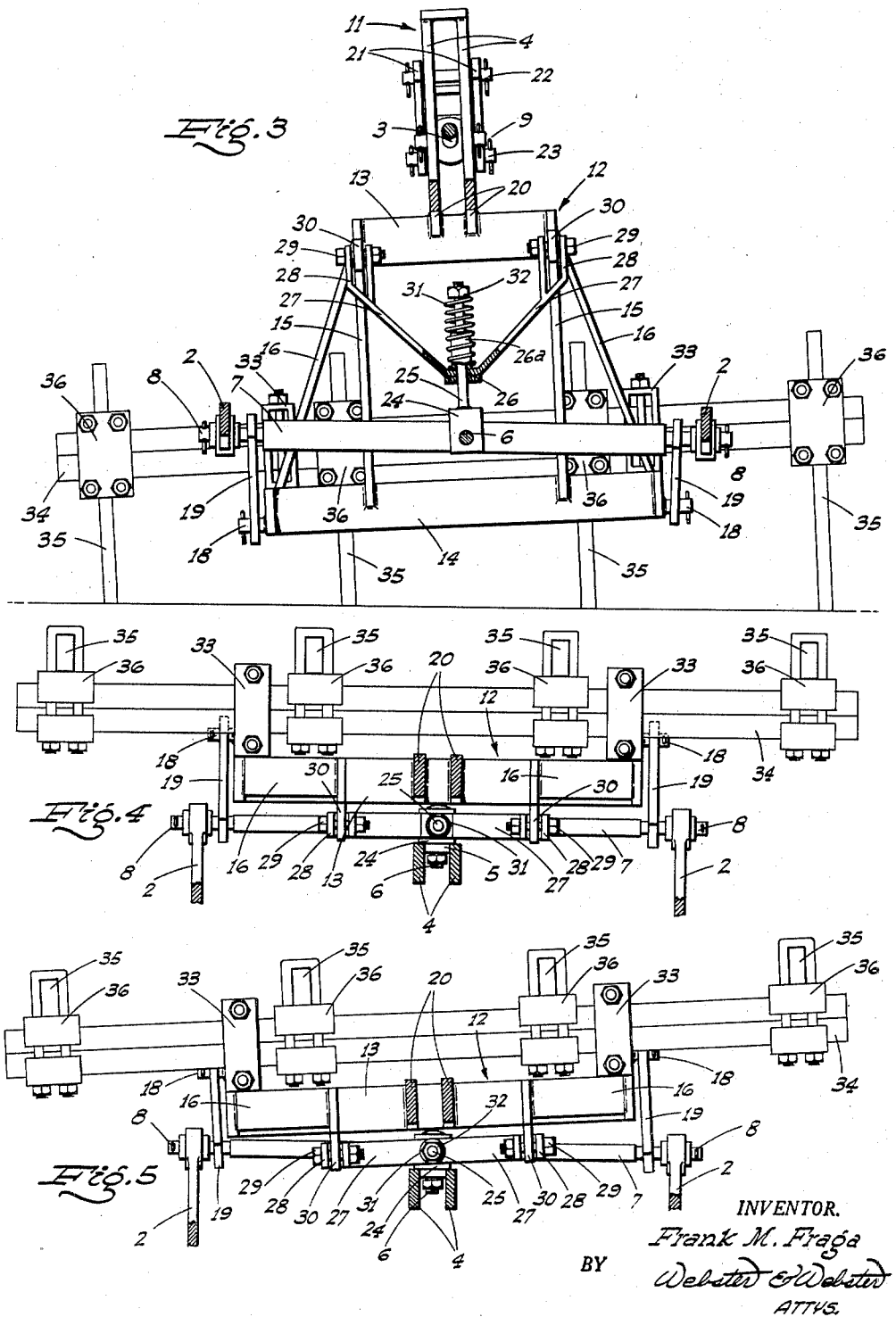

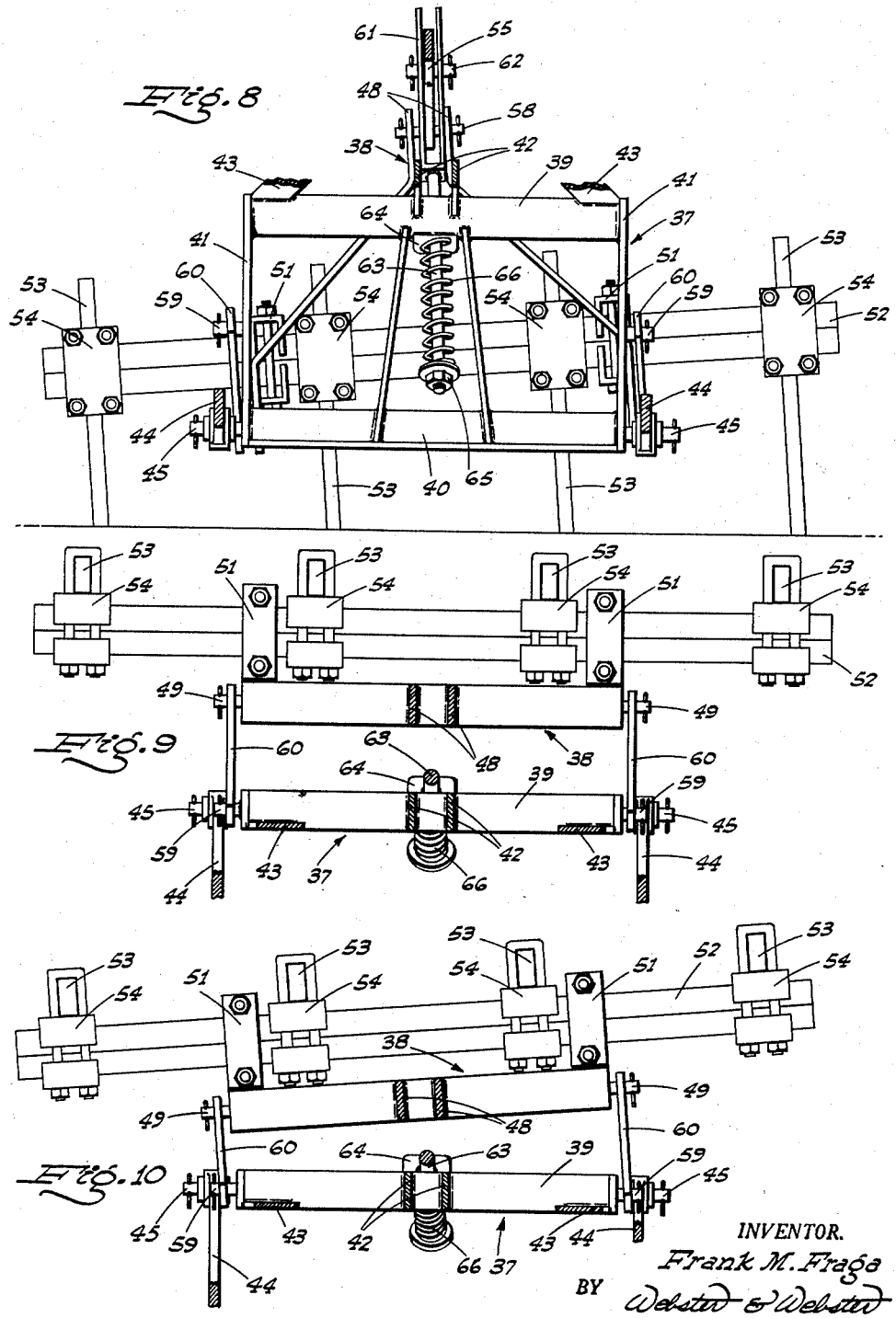

United States Patent Office 2,888,997
Patented June 2, 1959

2,888,997
COMPENSATING HITCH
Frank M. Fraga, Fresno, Calif.
Application November 30, 1956, Serial No. 625,542
8 Claims. (Cl. 172—448)

This invention relates in general to an improved lift-type hitch adapted to mount agricultural tools in connection with a tractor having transversely spaced lower lift links and a central upper link, and wherein all of the links project rearwardly from said tractor.

In particular the invention is directed to, and it is a major object to provide, a hitch which is effective to compensate for differential in drag resistance at opposite end portions of a transverse row of earth working tools carried by the hitch (or a single, relatively long transverse tool), whereby to minimize side draft on the tractor.

Another important object of the invention is to provide a hitch which is self-leveling; i.e., will maintain the transverse row of tools level, or running at substantially constant depth—when working in uniform ground—even though the tractor may tilt laterally as it passes over ground undulations.

A further object of the invention is to provide a hitch which includes a mounting structure which permits the transverse tool bar to rock in a generally transverse plane, yet imposes upon such bar a yieldable downward pressure, intermediate its ends; the rocking feature being for the attainment of the aforementioned compensation for differential drag resistance, while the yieldable downward pressure feature normally maintains said tool bar at level.

An additional object of the invention is to provide a hitch, of the type described, which is constructed so that it in no way interferes with—and permits smoother and more effective operation of—the automatic depth control mechanism on the tractor, and which mechanism is responsive to forward thrust on the central upper link.

Still another object of the invention is to provide a hitch which is designed for ease and economy of manufacture, and convenience of installation.

It is also an object of the invention to provide a practical, reliable, and durable hitch, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the hitch as mounted in connection with a tractor, and in use; the hitch and the transverse tool bar being in level running position.

Fig. 2 is a front elevation of the hitch in the same position as in Fig. 1; the tractor links being in section.

Fig. 3 is a transverse sectional elevation on line 3—3 of Fig. 1; the hitch and the transverse tool bar being shown in the positions occupied thereby upon increased drag resistance at one end portion of the row of earth working tools.

Fig. 4 is a sectional plan taken on line 4—4 of Fig. 2.

Fig. 5 is a similar sectional plan, but shows the hitch and the transverse tool bar as positioned in Fig. 3.

Fig. 6 is a side elevation of a modified type of the hitch as mounted in connection with a tractor, and in use; the hitch and the transverse tool bar being in level running position.

Fig. 7 is a front elevation of the modified hitch in the same position as in Fig. 6; the tractor links being in section.

Fig. 8 is a transverse sectional elevation on line 8—8 of Fig. 6; the hitch and the transverse tool bar being shown in the positions occupied thereby upon increased drag resistance at one end portion of the row of earth working tools.

Fig. 9 is a sectional plan taken on line 9—9 of Fig. 7.

Fig. 10 is a similar sectional plan, but shows the hitch and the transverse tool bar as positioned in Fig. 8.

Referring now more particularly to the drawings, and to the characters of reference marked thereon, and at present to Figs. 1-5 inclusive, the hitch is especially adapted—but not limited—for use in connection with a tractor, indicated generally at 1, which includes transversely spaced, lower lift links 2 and a central upper compression link 3; the lift links 2 being simultaneously actuated by a suitable power mechanism on the tractor, and which mechanism is controlled by thrust on the compression link 3. Such mechanism is not here shown, but is conventional.

The hitch—which is connected to the rear ends of links 2 and 3, as will hereinafter appear—comprises an upstanding slotted post 4 fitted at the lower end with a depending loose-play attachment plate 5 connected by a longitudinal bolt 6 to a substantially horizontal cross bar 7 centrally of the ends of the latter.

At its ends the cross bar 7 is formed with outwardly projecting trunnions 8 to which the rear ends of the lower links 2 are coupled in pivotal relation; the rear end of the upper link 3 being pivoted by a cross pin 9 in the upper portion of the slotted post 4. Said upper portion of the post includes a row of holes 10; the cross pin 9 being engaged in one of said holes, while another of said holes serves a purpose hereinafter described.

The post 4 and cross bar 7, connected together and mounted as above described, form what may be termed an upstanding forward frame, which is hereinafter identified generally as 11.

Adjacent but rearwardly of the forward frame 11 there is an upstanding rearward frame, indicated generally at 12. The latter—which is of A-frame type—includes a top cross member 13, a bottom cross member 14, upstanding side bars 15, and diagonal end braces 16; all in rigid unitary relation.

At the bottom, and on opposite sides, the frame 12 includes rearwardly projecting feet 17, and trunnions 18 project laterally outwardly from said feet.

Relatively short, rearwardly and downwardly inclined lower links 19 are pivotally connected to the trunnions 8 and thence extend to, and pivotally connect with, the trunnions 18; such links 19 having considerable loose-play with respect to the related trunnions 8 and 18.

The frame 12 is fitted—on the top cross member 13, centrally of the ends of the latter—with adjacent, transversely spaced, upstanding ears 20, and corresponding upper links 21 span between the upper portion of the post 4 and said ears 20. The upper links 21, which are relatively short and incline in the same direction as the lower links 19, are pivoted—at their upper ends—in connection with the post 4 by a cross pin 22, and at their lower ends in connection with ears 20 by a cross pin 23.

A clevis 24 straddles the cross bar 7 centrally of its ends and is attached thereto by the longitudinal bolt 6; one arm of the clevis lying between the attachment plate 5 and said cross bar. A rod 25 is fixed to the top of the clevis 24 and upstands therefrom; such rod projecting—intermediate its ends—through a hole 26 formed in the bottom of an upstanding V-shaped bracket 27 disposed between the frames 11 and 12. The rod also extends through a bushing 26a fixed to and upstanding from said bottom of the bracket 27.

At the upper end of each leg thereof the V-shaped bracket 27 is formed with a clevis 28 which straddles—and is pivotally connected by—a bolt 29 to an ear 30 which projects forwardly from the top portion of the corresponding side bar 15.

A heavy-duty compression spring 31 surrounds the rod 25 and bushing 26a between the bottom of the V-shaped bracket 27 and a nut 32 threaded on the upper end portion of said rod 25. Such nut 32 is adjusted so that the compression spring 31 is normally under load.

The transversely spaced, rearwardly projecting feet 17 on the frame 12 carry tool bar clamps 33 in which a transverse tool bar 34 is secured; the tool bar—as is usual—projecting laterally beyond both sides of the hitch, and throughout its length such bar carries spaced, earth working tools 35 attached by clamps 36.

In use of the above described hitch the links 2 are set, by the power mechanism on the tractor, so that the earth working tools 35 run at a selected depth, and while such tools run in uniform ground the tool bar 34 remains level, as shown—for example—in Figs. 2 and 4. This level running of the tool bar 34 continues even though the tractor may tilt laterally to one side or the other as it traverses ground undulations. This is for the reason that the compression spring 31 yieldably presses downwardly centrally on the bracket 27, and thus transmits an even or leveling pressure through the frame 12 and to the tool bar 34 even though the frame 11 may tilt laterally to one side or the other, and which tilting is in effect mainly by reason of the loose-play connection and motion of the links 19. This is the self-leveling feature of the hitch.

In the event that the earth working tools 35 at one end portion of the transverse tool bar 34 encounter harder ground, with resultant increase in drag resistance, the hitch compensates for the latter and avoids the otherwise attendant side draft on the tractor. This automatically results in the following manner:

As the earth working tools 35 on one end portion of the transverse tool bar 34 encounter the harder ground, the tool bar at said end moves rearwardly and upwardly a certain distance, with a corresponding movement forwardly and downwardly at the opposite end portion of the tool bar. As a result the earth working tools 35 at the end where the harder ground is encountered are lifted up, whereas the tools at the opposite end of the tool bar are pushed downward; all providing the desired compensating action, substantially balancing the draft load on the tractor, and materially minimizing side draft.

Such movement of the tool bar—upwardly and rearwardly at one end, and forwardly and downwardly at the other end, as shown in Figs. 3 and 5—is permitted of course mainly by reason of the loose-play connection and movement of the links 19; the frame 12 moving with the tool bar 34.

Also, the spring 31 not only normally levels the frame 12 and the transverse tool bar 34, but when there is a differential in drag resistance and said tool bar moves rearwardly and upwardly at one end, and forwardly and downwardly at the other end, the entire bar may float against such spring, and which aids in the compensating action.

Additionally, by virtue of its ability to compensate for differential in drag resistance, together with accomplishing normal leveling, the hitch makes possible smoother and more efficient operation of the automatic depth control mechanism on the tractor, and which mechanism functions in response to thrust—transmitted from the tools, tool bar, and hitch—imposed on the upper link 3.

In Figs. 6–10 inclusive I disclose a modified type of hitch, and wherein the upstanding forward frame and the upstanding rearward frame are indicated generally at 37 and 38, respectively.

The transversely spaced lower lift links on the tractor are indicated at 44, and such lift links are pivotally connected at their rear ends to trunnions 45 which project laterally from the lower corners of the forward frame 37.

The central upper compression link 46 on the tractor is disposed at its rear end in a lower portion of the slotted post 42, and is pivoted therein by a cross pin 47.

In this embodiment the upstanding rearward frame 38 is a conventional A-frame, and includes—at the top, and centrally thereof—upstanding, transversely spaced ears 48, and—at the bottom, and on opposite sides—laterally outwardly projecting trunnions 49.

The lower portion of the frame 38 is formed—on opposite sides—with rearwardly projecting feet 50 which carry the clamps 51 for a transverse tool bar 52 fitted—at spaced points in its length—with tools 53 attached to said bar by clamps 54.

The upstanding frames 37 and 38 are connected together in the following manner:

An upper link 55 is pivotally connected at one end by a cross pin 56 to the post 42; such connection being vertically adjustable, and to this end the post includes a row of holes 57 for selective reception of said cross pin 56. The upper link 55—which is of dog-leg form, and inclines generally rearwardly and downwardly—is pivotally attached at its lower end by a cross pin 58 to the ears 48.

The upstanding forward frame 37 is provided—on opposite sides adjacent but short of the trunnions 45—with other laterally outwardly projecting trunnions 59. Lower links 60 are pivoted at their upper ends on the trunnions 59, and thence extend at a rearward and downward incline to pivotal connection at their lower ends on the trunnions 49. The upper link 55 and the lower links 60 have loose-play connection at their pivot points.

The following spring means is employed for the purpose of normally urging the rearward frame 38 and the tool bar 52 yieldably in a downward direction:

An elongated clevis 61 is adjustably pivotally connected to the upper link 55—intermediate the ends of the latter—by a cross pin 62, and at the lower end thereof said clevis 61 is formed with a forwardly and downwardly inclined rod 63 which runs in slidable relation through an ear 64 fixed centrally on the top cross member 39; such rod terminating a distance below the ear 64 and being provided with a nut 65.

A compression spring 66 surrounds the rod 63 between the ear 64 and nut 65. The nut 65 is adjusted so that the compression spring 66 is normally under load.

The above described modified type of hitch functions generally in the same manner as described in connection with the embodiment shown in Figs. 1–5 inclusive. When the tools 53 are running in uniform ground the tool bar 52 is maintained level (see Figs. 7 and 9), even though the tractor may tilt laterally; such tilting movement—while transmitted to the forward frame 37—being lost to the rearward frame.

Also, when the tools 53 at one end portion of the tool bar 52 encounter harder ground, with increased drag resistance, said one end portion swings upwardly and rearwardly, while the opposite end portion swings forwardly and downwardly (see Figs. 8 and 10); all for the same purpose as described in connection with the previous embodiment.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A hitch, adapted to be secured to a tractor having transversely spaced lower links and a central upper link, all of said tractor links projecting rearwardly from the tractor; said hitch comprising an upstanding forward frame and an adjacent upstanding rearward frame, the forward frame including a cross bar, a central post upstanding therefrom, longitudinal pivot means connecting the post and the cross bar centrally of the length of the latter, means to connect the rear end of the central upper link to the post and the rear ends of the transversely spaced lower links to the corresponding ends of the cross bar, means to secure a transverse tool bar intermediate its ends on the rearward frame, an upper connection link pivoted to and spanning between the upper portion of the post and said rearward frame, and transversely spaced lower connection links pivoted in loose-play retation to and spanning between the ends of the cross bar and corresponding points on the lower portion of said rearward frame.

2. A hitch, adapted to be secured to a tractor having transversely spaced lower links and a central upper link, all of said tractor links projecting rearwardly from the tractor; said hitch comprising an upstanding forward frame and an adjacent upstanding rearward frame, the forward frame including a cross bar, a central post upstanding therefrom, longitudinal pivot means connecting the post and the cross bar centrally of the length of the latter, means to connect the rear end of the central upper link to the post and the rear ends of the transversely spaced lower links to the corresponding ends of the cross bar, means to secure a transverse tool bar intermediate its ends on the rearward frame, an upper connection link pivoted to and spanning between the upper portion of the post and said rearward frame, transversely spaced lower connection links pivoted in loose-play relation to and spanning between the ends of the cross bar and corresponding points on the lower portion of said rearward frame, and spring means between the cross bar and rearward frame yieldably urging the latter and said tool bar downwardly; said spring means including a rod attached to and upstanding from the cross bar centrally thereof, a member on the rear frame having a hole through which the rod projects, a stop element on the upper end of the rod, and a compression spring on the rod between such member and element.

3. A hitch, adapted to be secured to a tractor having transversely spaced lower links and a central upper link, all of said tractor links projecting rearwardly from the tractor; said hitch comprising an upstanding forward frame and an adjacent upstanding rearward frame, the forward frame including a cross bar, a central post upstanding therefrom, means to connect the rear end of the central upper link to the post and the rear ends of the transversely spaced lower links to the corresponding ends of the cross bar, means to secure a transverse tool bar intermediate its ends on the rearward frame, an upper connection link pivoted to and spanning between the upper portion of the post and said rearward frame, transversely spaced lower connection links pivoted to and spanning between the ends of the cross bar and corresponding points on the lower portion of said rearward frame, and spring means between the cross bar and rearward frame yieldably urging the latter and said tool bar downwardly; said spring means including a rod attached centrally to and upstanding from the cross bar, a V-shaped bracket pivoted at its upper ends to the rearward frame and depending from above the cross bar, a bottom opening in the bracket, the rod projecting through the opening, a stop on the upper end of the rod, and a compression spring surrounding the rod between the stop and the bottom of the bracket.

4. A hitch, adapted to be secured to a tractor having hitch attachment members projecting from the rear, comprising an upstanding forward frame which includes a lower cross bar pivoted centrally of its ends on a longitudinal axis, means connecting the attachment members to said forward frame, an upstanding rearward frame, means to secure a transverse tool bar on the rearward frame, a central upper link pivotally connected between the frames above said cross bar, and transversely spaced lower links pivotally connected between the rearward frame and the cross bar of the forward frame.

5. A hitch, adapted to be secured to a tractor having hitch attachment members projecting from the rear, comprising an upstanding forward frame, means connecting the attachment members to said forward frame, an upstanding rearward frame, means to secure a transverse tool bar on the rearward frame, a central upper link pivotally connected between the frames, transversely spaced lower links pivotally connected between the frames, and spring means between the frames yieldably urging the rearward frame in a downward direction, said spring means including a rod, means pivoting the rod at one end to the central upper link intermediate its ends, the rod thence extending at a forward and downward incline, an element on the forward frame through which the rod slidably extends intermediate its ends, a stop on the rod below said element, and a compression spring on the rod between said element and stop.

6. A hitch, adapted to be secured to a tractor having transversely spaced lower links and a central upper link, all of said tractor links projecting rearwardly from the tractor; said hitch comprising an upstanding forward frame and an adjacent upstanding rearward frame, means to connect the rear ends of the tractor links to corresponding points on the forward frame, means to secure a transverse tool bar intermediate its ends to the rearward frame, a central upper link pivotally connected between the frames, and transversely spaced lower links pivotally connected between the frames; the forward frame including vertically spaced, laterally outwardly projecting trunnions on each side adjacent the bottom, the transversely spaced lower links on the tractor being connected at their rear ends to the corresponding trunnions, and the lower, frame connecting links having their forward ends coupled to the corresponding trunnions.

7. A hitch adapted to be secured to a tractor having transversely spaced lower links and a central upper link, all of said tractor links projecting rearwardly from the tractor; said hitch comprising an upstanding forward frame and an adjacent upstanding rearward frame, the forward frame including a central post, a cross bar below the same and a longitudinal pivot connecting the post and bar, means to connect the upper and lower tractor mounted links to the post and cross bar respectively, means to mount a transverse tool bar on the rearward frame adjacent the lower end thereof, said rearward frame comprising upper and lower cross members, side bars connecting the cross members, and central ears upstanding from the top member; a link pivotally connecting the ears and post adjacent the upper end of the latter in lateral loose-play relation, and other links pivotally connecting the lower end of the rearward frame and the ends of the cross bar in lateral loose-play relation.

8. A hitch, as in claim 7, with a clevis straddling the cross bar and swivelled on the longitudinal pivot thereof, a rod fixed with and upstanding from the clevis, a bracket through the bottom of which the rod slides, and having upwardly diverging side arms, a compression spring on the rod above the bottom of the bracket and engaging the same, a stop on the rod above the spring, and ears on the rearward frame adjacent the top cross member and on which the bracket arms at their upper end are pivoted in a plane parallel to and above the cross bar.

References Cited in the file of this patent

UNITED STATES PATENTS

| | | |
|---|---|---|
| 1,864,639 | Crezee | June 28, 1932 |
| 2,140,144 | Silver | Dec. 13, 1938 |
| 2,395,322 | Evans | Feb. 19, 1946 |
| 2,456,693 | Fraga | Dec. 21, 1948 |
| 2,518,360 | Morkoski | Aug. 8, 1950 |
| 2,551,870 | Bridger | May 8, 1951 |
| 2,649,722 | Raught | Aug. 25, 1953 |
| 2,653,531 | Collins | Sept. 29, 1953 |
| 2,653,823 | Wilson | Sept. 29, 1953 |
| 2,724,314 | Evans | Nov. 22, 1955 |

FOREIGN PATENTS

| | | |
|---|---|---|
| 816,610 | Germany | Oct. 11, 1951 |
| 870,610 | Germany | Mar. 16, 1953 |
| 556,859 | Great Britain | Oct. 26, 1943 |
| 1,039,920 | France | Oct. 12, 1953 |